United States Patent [19]
Fassler et al.

[11] Patent Number: 6,059,869
[45] Date of Patent: May 9, 2000

[54] INKS FOR INK JET PRINTERS

[75] Inventors: Werner Fassler, Rochester; Charles D. DeBoer, Palmyra; John E. Mooney, Rochester, all of N.Y.

[73] Assignee: Eastman Kodak Company, Rochester, N.Y.

[21] Appl. No.: 09/198,128

[22] Filed: Nov. 23, 1998

[51] Int. Cl.⁷ ..................................... C09D 11/00
[52] U.S. Cl. ................. 106/31.27; 106/31.6; 106/31.58; 106/31.86
[58] Field of Search ................ 106/31.27, 31.6, 106/31.58, 31.86

[56] References Cited

U.S. PATENT DOCUMENTS 4,877,451   10/1989   Winnik et al. ....................... 106/31.46

*Primary Examiner*—Helene Klemanski
*Assistant Examiner*—Veronica F. Faison
*Attorney, Agent, or Firm*—Raymond L. Owens

[57] ABSTRACT

An ink for use in an inkjet printer having nozzles for ejecting ink droplets includes a colorant, a hydroxysilane having at least two hydroxy groups, and a liquid carrier for the colorant and the silane.

7 Claims, No Drawings

INKS FOR INK JET PRINTERS

FIELD OF THE INVENTION

This invention relates to ink jet printing and, more particularly, to inks for ink jet printing that are simple and economical to formulate.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. In recent years the drop size of ink jet printers has tended to become smaller and smaller, resulting in higher resolution and higher quality prints. The smaller drop size is accompanied by smaller nozzle openings in the inkjet printhead. These smaller nozzle openings are easier to plug and more sensitive to extraneous deposits which can affect both the size and placement accuracy of the ink jet drop. The composition of the ink formula is known to contribute to nozzle plugging, and for this, among other reasons, humectants, biocides and surfactants are usually added to ink jet inks.

It has been recognized that there is a need to maintain the ink ejecting nozzles of an ink jet printhead, for example, by periodically cleaning the orifices when the printhead is in use, and/or by capping the printhead when the printer is out of use or is idle for extended periods of time. The capping of the printhead is intended to prevent the ink in the printhead from drying out. There is also a need to prime a printhead before use, to insure that the printhead channels are completely filled with ink and contain no contaminants or air bubbles and also periodically to maintain proper functioning of the orifices. Maintenance and/or priming stations for the printheads of various types of ink jet printers are described in, for example, U.S. Pat. Nos. 4,855,764; 4,853,717; and 4,746,938. Removal of gas from the ink reservoir of a printhead during printing is described in U.S. Pat. No. 4,679,059. In U.S. Pat. No. 4,306,245 to Kasugayama et al., a liquid jet recording device provided with a cleaning protective means for cleaning and protecting an orifice is described. The cleaning protective means is provided at a reset position lying at one end of the scanning shaft of the device.

U.S. Pat. No. 5,250,962 to Fisher et al., describes a movable priming station for use with an ink jet printer having a printhead with a linear extended array of nozzles. The movable priming station includes a support capable of moving along the extended array of nozzles and a vacuum tube having a vacuum port adjacent to one end thereof. The support is controlled so that the vacuum port does not contact the nozzle containing surface of the printhead when the support is moved along the linear array of nozzles. U.K. Patent Application GB2203994 to Takahashi et al., describes an applicator for applying antiwetting compositions to the nozzle bearing face of a printhead of an ink drop printer. The printhead which reciprocates across the face of a platen is moved to one end of the platen where the applicator is placed. The applicator includes an extendable pad which wipes the face of the printhead.

Conventional continuous ink jet printing utilizes electrostatic charging "tunnels" that are placed close to the point where the ink drops are formed in a stream. In this manner, individual drops may be charged, and these drops may be deflected downstream by the presence of deflector plates that have a large potential difference between them. A gutter (sometimes known as a "catcher") may be used to intercept the charged drops, while the uncharged drops are free to strike the recording medium. If there is no electric field present, or if the drop break off point is sufficiently far from the electric field (even if a portion of the stream before the drop break off point is in the presence of an electric field), then charging will not occur.

Inks for high-speed ink jet drop printers must have a number of special characteristics. Typically, water-based inks have been used because of their conductivity and viscosity range. Thus, for use in a jet drop printer the ink must be electrically conductive, having a resistivity below about 5000 ohm-cm and preferably below about 500 ohm-cm. For good fluidity through small orifices, the water-based inks generally have a viscosity in the range between 1 and 15 centiposes at 25° C.

Beyond this, the inks must be stable over a long period of time, compatible with ink jet materials, free of microorganisms and functional after printing. Required functional characteristics include resistance to smearing after printing, fast drying on paper, and being waterproof when dried.

Problems to be solved with aqueous ink jet inks include the large energy needed for drying, cockling of large printed areas on paper surfaces, ink sensitivity to rubbing, the need for an anti-microbial agent and clogging of the ink jet printer orifices from dried ink an other adventitious contaminants.

The non-water component of ink jet inks generally serves as a humectant which has a boiling point higher than that of water (100° C.). The ink liquid vehicle components, i.e., the water and the humectants, generally possess absorption characteristics on paper and evaporation properties allowing for the desired ink jet printing speed when the ink is to be used in an ink jet printing process.

Many ink jet ink formulation have been patented. U.S. Pat. No. 5,738,716 by Domenic Santilli, et al. issued Apr. 14, 1998 describes the preparation of ink jet inks by dispersing pigments in water.

U.S. Pat. No. 5,431,722 by Yoshiro Yamashita, et al. issued Jul. 11, 1995 discloses the use of a buffer to control the pH of ink jet ink.

U.S. Pat. No. 5,725,647 James G. Carlson, et al., issued Mar. 10, 1998 disclose pigmented inks with added humectants.

As the prior art shows, there are many components added to ink jet ink formulations in order to minimize the problems noted above.

SUMMARY OF THE INVENTION

It is an object of the present invention to provide inks for ink jet printing that will consistently deliver an accurate and reproducible drop of ink to provide uniform, accurate, and consistent prints.

A further object of this invention is to provide an ink which has relatively few components and which remains wet and which is readily air curable when deposited on a receiver surface.

These objects are achieved by an ink for use in an inkjet printer having nozzles for ejecting ink droplets, comprising:
 a) a colorant;
 b) a hydroxysilane having at least two hydroxy groups; and
 c) a liquid carrier for the colorant and the silane.

ADVANTAGES

Inks made in accordance with the present invention can have fewer components. The hydroxysilane, as one of the components, provides unique advantages in that it acts as a humectant, biocide, and surfactant and permits the ink to be readily cured when deposited on a receiver.

DETAILED DESCRIPTION OF THE INVENTION

As described in the section on the background of the invention, among the causes of ink jet clogging are growth of bacterial colonies, dried ink particles, and failure to wet the nozzle surfaces. For these reasons, biocides, humectants, and surfactants or detergents are included in the ink jet inks. Not all biocides, humectants and surfactants are compatible with the colorants used in ink jet printing. In particular, when dispersed pigments are used as colorants, an incompatible ingredient can cause clumping and agglomeration of the pigment, resulting in either or both a) plugging of the ink jet head and b) loss of covering power and image density of the colorant. This can limit the choice of colorants for ink jet inks, resulting in more costly inks and colorants of less than optimum hue.

In this invention, the functions of biocide, humectant and surfactant are all performed by one compound, an hydroxysilane having at least two hydroxy groups. In a preferred embodiment of the invention, the silane is 3-aminopropyltrihydroxysilane, derived from the hydrolysis of 3-aminopropyltriethoxysilane or 3-aminopropyltrimethoxysilane. The hydrolysis is accomplished simply by mixing the trialkoxysilane with water and letting the mixture stand at room temperature for a few hours. There are many silanes which may be employed in this invention. As examples of silanes, mention may be made of the reaction products of 3-aminopropyltriethoxysilane and anhydrides such as acetic anhydride, phthalic anhydride, and succinic anhydride. Also, the reaction products of 3-aminopropyltriethoxysilane and epoxides such as glycidol, styrene oxide, ethylene oxide, and propylene oxide can be used. Other examples of silanes include 3-aminopropylmethyldiethoxysilane, which hydrolyzes to an hydroxysilane having two hydroxy groups, aminoethylaminopropyltriethoxysilane, and glycidoxypropyltriethoxysilane. It will be understood by those skilled in the art that all of the above mentioned silanes will rapidly hydrolyzed to di- or tri-hydroxysilanean hydroxysilane having at least two hydroxy groups upon mixing with water. It will also be understood by those skilled in the art that a water solution of an hydroxysilane having at least two hydroxy groups will be in rapid and continuous equilibrium with condensed structures wherein water is eliminated between two hydroxysilane molecules giving silicon-oxygen-silicon structures. Since the equilibrium condensation reactions are reversible, there will always be some of the monomeric hydroxsilane present, along with the condensed species. The exact ratio of the different condensed species to the monomeric species will depend on the total concentration of the solution, the amount of other solvents present, if any, and the temperature of the mixture.

The colorants of this invention can be a dye, a pigment, a metal, or a dichroic stack of materials that absorb radiation by virtue of their refractive indexes and thickness. In a preferred embodiment of the invention, the colorant is Unisperse Blue (Ciba Giegy) and the silane is 3-3-aminopropyltrietoxysilane and the liquid is water. In another preferred embodiment of the invention, the colorants are acid dyes such as tartrazine (acid yellow 23) and the silane is 3-aminopropyltriethoxysilane.

Dyes suitable for use as colorants include water soluble dyes such as direct dyes, acid dyes, basic dyes, reactive dyes, and food colors. As noted above, in preferred embodiments of the invention acid dyes are used. Examples of acid dyes are: C.I. Acid Black 1, 2, 7, 16, 17, 24, 26, 28, 31, 41, 48, 52, 58, 60, 63, 94, 107, 109, 112, 118, 119, 121, 122, 131, 155, 156; C.I. Acid Yellow 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 99, 111, 114, 116, 122, 135, 161, 172; C.I. Acid Orange 7, 8, 10, 33, 56, 64; C.I. Acid Red 1, 4, 6, 8, 13, 14, 15, 18, 19, 21, 26, 27, 30, 32, 34, 35, 37, 40, 42, 51, 52, 54, 57, 80, 82, 83, 85, 87, 88, 89, 92, 94, 97, 106, 108, 110, 115, 119, 129, 131, 133, 134, 135, 154, 155, 172, 176, 180, 184, 186, 187, 243, 249, 254, 256, 260, 289, 317, 318; C.I. Acid Violet 7, 11, 15, 34, 35, 41, 43, 49, 75; C.I Acid Blue 1, 7, 9, 22, 23, 25, 27, 29, 40, 41, 43, 45, 49, 51, 53, 55, 56, 59, 62, 78, 80, 81, 83, 90, 92, 93, 102, 104, 111, 113, 117, 120, 124, 126, 145, 167, 171, 175, 183, 229, 234, 236; C.I. Acid Green 3, 12, 19, 27, 41, 9, 16, 20, 25; C.I. Acid Brown 4, and 14.

The liquid carriers of the colorant and the silane of this invention are preferably water and various water-soluble organic solvents. As examples of water-soluble organic solvents, mention may be made of alkyl alcohols of 1 to 4 carbon atoms such as methyl alcohol, ethyl alcohol, n-n-propyl alcohol, isopropyl alcohol, n-butyl alcohol, sec-butyl alcohol, tert-butyl alcohol, and isobutyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols having 2 to 6 alkylene groups such as ethylene glycol, propylene glycol, butylene glycol, triethylene glycol, 1,2,6-hexanetriol, thiodiglycol, hexylene glycol, and diethylene glycol; and lower alkyl ethers of polyhydric alcohols such as glycerol, ethylene glycol methyl ether, diethylene glycol methyl (or ethyl) ether, and triethylene glycol monomethyl ether. Of these various water-soluble organic solvents, especially preferred are polyhydric alcohols such as diethylene glycol and lower alkyl ethers of polyhydric alcohols such as triethylene glycol monomethyl ether and triethylene glycol monoethyl ether.

Although one of the advantages of the present invention is a simplified formula for the ink jet ink, in certain cases it may desirable to employ additional additives in the formula. Examples of other additives are pH controlling agents, metal chelating agents, antifungal agents, viscosity controlling agents, surface tension controlling agents, wetting agents, surface active agents, and rust preventives.

The following examples will illustrate the practice of the invention.

EXAMPLE 1

A mixture of 20 g of Unisperse Blue pigment dispersion (Ciba Giegy), 80 g of water, and 10 g of 3-aminopropyltriethoxysilane was filtered through a 1 micron glass fiber filter disk and loading to the empty ink jet cartridge of an Epson Stylus Color 600 ink jet printer. The printer was activated and excellent cyan prints were produced on plain paper.

EXAMPLE 2

A mixture of 5 g of tartrazine (Acid Yellow 23, C.I. 19140), 85 g of water, and 10 g of 3-aminopropyltriethoxysilane was filtered through a 1 micron glass fiber filter disk and loading to the empty ink jet cartridge of an Epson Stylus Color 600 ink jet printer. The printer was activated and excellent yellow prints were produced on plain paper.

EXAMPLE 3

A mixture of 5 g of Brilliant Blue G (Acid Blue 90, C.I. 42655), 85 g of water, and 10 g of 3-aminopropyltriethoxysilane was filtered through a 1 micron glass fiber filter disk and loading to the empty ink jet cartridge of an Epson Stylus Color 600 ink jet printer. The printer was activated and excellent cyan prints were produced on plain paper.

EXAMPLE 4

A mixture of 5 g of Brilliant Crocein MOO (Acid Red 73, C.I. 27290), 85 g of water, and 10 g of 3-aminopropyltriethoxysilane was filtered through a 1 micron glass fiber filter disk and loading to the empty ink jet cartridge of an Epson Stylus Color 600 ink jet printer. The printer was activated and excellent magenta prints were produced on plain paper.

The invention has been described in detail, with particular reference to certain preferred embodiments thereof, but it should be understood that variations and modifications can be effected with the spirit and scope of the invention.

What is claimed is:

1. An ink for use in an inkjet printer having nozzles for ejecting ink droplets, comprising a mixture of:
   a) a colorant;
   b) hydroxysilanes each having at least two hydroxy groups wherein the hydroxysilane condense to eliminate water and provide silicon-oxygen-silicon structures; and
   c) a liquid carrier for the colorant and the hydroxysilanes.

2. The ink according to claim 1 wherein the colorant is a pigment or dye.

3. The ink according to claim 1 wherein the hydroxysilane is selected from the group consisting of: the reaction products of 3-aminopropyltriethoxysilane and acetic anhydride, phthalic anhydride, or succinic anhydride; the reaction products of 3-aminopropyltriethoxysilane and glycidol, styrene oxide, ethylene oxide; or propylene oxide, 3-aminopropylmethyl diethoxysilane, aminoethylaminopropyltriethoxysilane, and glycidoxypropyltriethoxysilane.

4. The ink according to claim 1 wherein the liquid carrier includes water.

5. The ink according to claim 4 wherein the liquid carrier further includes at least one alcohol.

6. The ink according to claim 1 wherein the liquid carrier further includes at least one alcohol.

7. The ink according to claim 1 wherein the liquid carrier includes water and the colorant is a pigment dispersed in the liquid carrier.

\* \* \* \* \*